US010581051B2

(12) United States Patent
Suzuki et al.

(10) Patent No.: US 10,581,051 B2
(45) Date of Patent: Mar. 3, 2020

(54) SEPARATOR WINDING CORE, SEPARATOR ROLL, AND METHOD OF CLEANING SEPARATOR WINDING CORE

(71) Applicant: Sumitomo Chemical Company, Limited, Tokyo (JP)

(72) Inventors: Junji Suzuki, Niihama (JP); Takamasa Egawa, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/727,955

(22) Filed: Oct. 9, 2017

(65) Prior Publication Data

US 2018/0183030 A1 Jun. 28, 2018

(30) Foreign Application Priority Data

Dec. 23, 2016 (JP) ................................. 2016-250239
May 2, 2017 (JP) ................................. 2017-091611
Sep. 14, 2017 (JP) ................................. 2017-177052

(51) Int. Cl.
*H01M 2/14* (2006.01)
*H01M 2/18* (2006.01)
*B65H 75/10* (2006.01)
*B65H 75/50* (2006.01)

(52) U.S. Cl.
CPC .............. *H01M 2/18* (2013.01); *B65H 75/10* (2013.01); *B65H 75/505* (2013.01); *H01M 2/145* (2013.01); *H01M 2/14* (2013.01)

(58) Field of Classification Search
None
See application file for complete search history.

(56) References Cited

U.S. PATENT DOCUMENTS

| 2012/0141176 A1* | 6/2012 | Matsushima ...... G03G 15/6585 |
| | | 399/341 |
| 2014/0322585 A1 | 10/2014 | Iizuka et al. |
| 2015/0030931 A1* | 1/2015 | Takahata ............... H01M 4/133 |
| | | 429/231.8 |
| 2015/0255768 A1* | 9/2015 | Konishi ............... D04H 1/4382 |
| | | 429/144 |

(Continued)

FOREIGN PATENT DOCUMENTS

| CN | 104022278 A | * | 9/2014 | ............ H01M 4/505 |
| JP | 2013-139340 A | | 7/2013 | |
| JP | 2015-129670 A | | 7/2015 | |

(Continued)

OTHER PUBLICATIONS

Office Action dated Aug. 10, 2017 in KR Application No. 10-2017-0041679.

(Continued)

*Primary Examiner* — Jonathan Crepeau
*Assistant Examiner* — Angela J Martin
(74) *Attorney, Agent, or Firm* — Panitch Schwarze Belisario & Nadel LLP

(57) ABSTRACT

The invention provides for a reduction in the period of time necessary for recycling a separator winding core around which a nonaqueous electrolyte secondary battery separator is wound. The separator winding core is described by the Munsell color system as (i) a lightness of not less than 3.0 but not more than 9.2 and (ii) a chroma of not less than 0.5.

6 Claims, 1 Drawing Sheet

(56) References Cited

U.S. PATENT DOCUMENTS

2016/0263687 A1  9/2016 Matsunaga et al.
2017/0016837 A1* 1/2017 Nishikata ............. G01N 21/896

FOREIGN PATENT DOCUMENTS

| KR | 10-1993-0004501 A | 3/1993 |
| KR | 10-2014-0070832 A | 6/2014 |
| KR | 10-2015-0067405 A | 6/2015 |
| KR | 10-2015-0076371 A | 7/2015 |
| KR | 10-2015-0080686 A | 7/2015 |
| KR | 10-2016-0076750 A | 7/2016 |
| KR | 10-2016-0110210 A | 9/2016 |

OTHER PUBLICATIONS

Office Action dated Apr. 27, 2018 in Korean Application No. 10-2017-0041679.

* cited by examiner

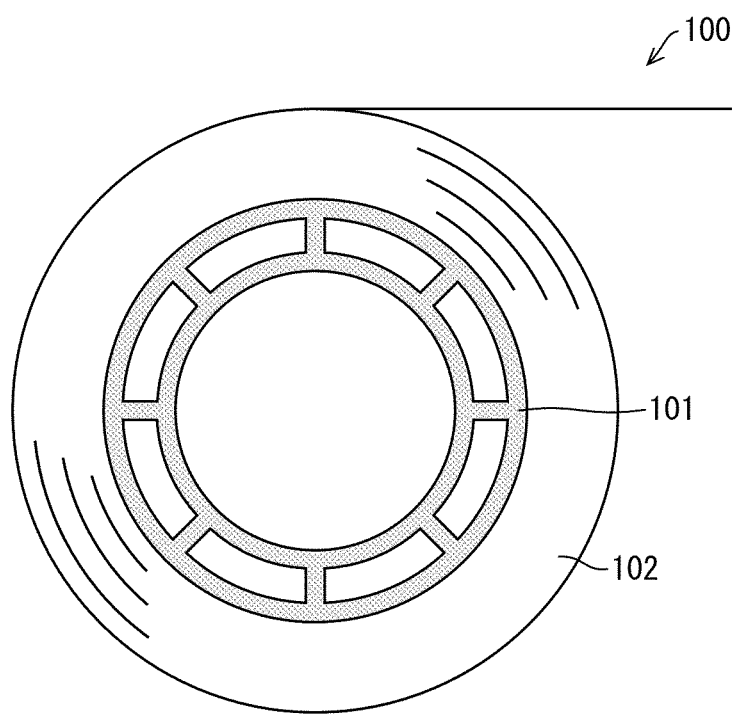

SEPARATOR WINDING CORE, SEPARATOR ROLL, AND METHOD OF CLEANING SEPARATOR WINDING CORE

This Nonprovisional application claims priority under 35 U.S.C. § 119(a) on Patent Applications Nos. 2016-250239, 2017-091611 and 2017-177052 filed in Japan on Dec. 23, 2016, May 2, 2017 and Sep. 14, 2017, respectively, the entire contents of which are hereby incorporated by reference.

TECHNICAL FIELD

The present invention relates to (i) a separator winding core around which a separator for a nonaqueous electrolyte secondary battery (hereinafter referred to as a "nonaqueous electrolyte secondary battery separator") is to be wound, (ii) a separator roll including the separator winding core, and (iii) a method of cleaning the separator winding core.

BACKGROUND ART

A nonaqueous electrolyte secondary battery such as a lithium-ion secondary battery is in widespread use as a battery for use in devices such as a personal computer, a mobile phone, and a mobile information terminal. Attention is paid to, in particular, the lithium-ion secondary battery because the lithium-ion secondary battery emits less carbon dioxide and makes a greater contribution to energy saving than a conventional secondary battery.

There has so far been advancement in development of a separator winding core around which a nonaqueous electrolyte secondary battery separator (film) is to be wound (see Patent Literature 1).

CITATION LIST

Patent Literature

[Patent Literature 1]
Japanese Patent Application Publication Tokukai No. 2013-139340 (Publication date: Jul. 18, 2013)

SUMMARY OF INVENTION

Technical Problem

Recently, there has been considered recycling a separator winding core after use of a separator roll in which a nonaqueous electrolyte secondary battery separator is wound around the separator winding core. This is because the separator winding core is relatively expensive.

Steps which are necessary for recycling the separator winding core include the following steps (a) through (d): step (a) of checking, on the basis of a criterion sample, that the separator winding core has no chipping and crack; step (b) of, in a case where the separator winding core has a label attached thereto, detaching the label from the separator winding core; step (c) of removing stain from, for example, a take-up surface, an inner surface and a rib of the separator winding core; and step (d) of checking that the stain has been removed enough so that the separator winding core can be recycled. In particular, the step (d) needs to be carried out precisely enough to prevent a foreign material from getting mixed with a product so as to reduce the probability that a defective nonaqueous electrolyte secondary battery occurs in a case where the separator winding core is recycled.

In order to reduce a period of time required in the step (d), it is necessary to immediately find stain such as black electrically-conductive substances (e.g., acetylene black and graphite) and white substances (e.g., dust and a waste separator) which remain on the separator winding core. Note here that the waste separator represents, for example, (i) a fragment of a polyolefin porous film or (ii) an inorganic filler which comes off from a functional layer provided on the polyolefin porous film. A technique disclosed in Patent Literature 1, however, has no consideration of immediately finding such stain.

The present invention was made in view of the problem, and an object of the present invention is to provide (i) a separator winding core which is capable of reducing a period of time required in a step which is necessary for recycling the separator winding core, (ii) a separator roll including the separator winding core, and (iii) a method of cleaning the separator winding core.

Solution to Problem

In order to attain the object, a separator winding core in accordance with an aspect of the present invention is configured to be a separator winding core around which a nonaqueous electrolyte secondary battery separator is to be wound, the separator winding core being described by the Munsell color system as (i) a lightness (value) of not less than 3.0 but not more than 9.2 and (ii) a chroma of not less than 0.5.

The configuration allows stain, such as a black electrically-conductive substance and/or a white substance each having adhered to the separator winding core in accordance with the aspect of the present invention, to be immediately found with ease. This is because such black substance and white substance visually stand out enough. With the configuration, it is therefore possible to reduce a period of time required in a checking step which is necessary for recycling the separator winding core. Note that a color of the separator winding core is usually determined with the use of a color sample.

Advantageous Effects of Invention

The present invention makes it possible to reduce a period of time required in a checking step which is necessary for recycling a separator winding core.

BRIEF DESCRIPTION OF DRAWINGS

FIG. 1 is a side view schematically illustrating a configuration of a separator roll in accordance with an embodiment of the present invention.

DESCRIPTION OF EMBODIMENTS

FIG. 1 is a side view schematically illustrating a configuration of a separator roll 100. The separator roll 100 includes (i) a separator winding core 101 and (ii) a nonaqueous electrolyte secondary battery separator 102 which is wound around the separator winding core 101.

The nonaqueous electrolyte secondary battery separator 102 is provided, in a nonaqueous electrolyte secondary battery, so as to be sandwiched between a positive electrode and a negative electrode. The present embodiment assumes a case where the nonaqueous electrolyte secondary battery is a lithium-ion secondary battery. The nonaqueous electrolyte secondary battery separator 102 is a porous film which (i)

separates the positive electrode from the negative electrode and (ii) enables lithium ions to move between the positive electrode and the negative electrode. Examples of the material of the nonaqueous electrolyte secondary battery separator 102 encompass polyolefin such as polyethylene and polypropylene.

The separator winding core 101, around which the nonaqueous electrolyte secondary battery separator 102 is to be wound, is also referred to as a core. The separator winding core 101 is made of, for example, an ABS resin.

A color of the separator winding core 101 is described by the Munsell color system as (i) a lightness (Value) of not less than 3.0 but not more than 9.2 and (ii) a chroma (Chroma) of not less than 0.5. The lightness of the color of the separator winding core 101 is more preferably not less than 4.0 but not more than 9.0. This allows stain, such as a black electrically-conductive substance and/or a white substance each having adhered to the separator winding core 101, to be immediately found with ease. This is because such black substance and white substance visually stand out enough. It is therefore possible to reduce a period of time required in a checking step which is necessary for recycling the separator winding core 101, as compared with a period of time required in a step which is necessary for recycling a conventional separator winding core.

In contrast, in a case where the color of the separator winding core is not described by the Munsell color system as (i) the lightness of not less than 3.0 but not more than 9.2 or (ii) the chroma of not less than 0.5, it is difficult to distinguish, visually or by optical test, the stain and a damage due to such black substance and white substance. This causes a foreign material to get mixed, and consequently causes a defective nonaqueous electrolyte secondary battery to undesirably occur.

A method of cleaning the separator winding core 101 is a method of cleaning the separator winding core 101 having an outer peripheral surface around which the nonaqueous electrolyte secondary battery separator 102 is to be wound. The method comprises the steps of (i) removing a foreign material which has adhered to a surface of the separator winding core 101 and (ii) checking whether or not a quantity of the foreign material is not more than a criterion.

The separator roll 100 is configured so that the nonaqueous electrolyte secondary battery separator 102 is wound around the outer peripheral surface of the separator winding core 101 which has been cleaned by the above method.

With the configurations, it is possible to reduce a production cost of the separator roll 100 by recycling the separator winding core 101 which is relatively expensive. With the configurations, it is also possible to contribute to environmental conservation because of a reduction in waste amount of the separator winding core 101.

A separator winding core in accordance with Aspect 1 of the present invention is configured to be a separator winding core around which a nonaqueous electrolyte secondary battery separator is to be wound, the separator winding core being described by the Munsell color system as (i) a lightness (value) of not less than 3.0 but not more than 9.2 and (ii) a chroma of not less than 0.5.

The configuration allows stain, such as a black electrically-conductive substance and/or a white substance each having adhered to the separator winding core in accordance with Aspect 1 of the present invention, to be immediately found with ease. This is because such black substance and white substance visually stand out enough. With the configuration, it is therefore possible to reduce a period of time required in the checking step which is necessary for recycling the separator winding core. Note that a color of the separator winding core is usually determined with the use of a color sample.

The separator winding core in accordance with Aspect 2 of the present invention is preferably configured so that, in particular, the lightness is not less than 4.0 but not more than 9.0.

The separator winding core in accordance with Aspect 3 of the present invention preferably has a surface whose glossiness is not less than 10 but not more than 130.

The separator winding core in accordance with Aspect 4 of the present invention is preferably configured so that, in particular, the glossiness of the surface is not less than 20 but not more than 100.

It is not preferable that the glossiness (gloss unit; GU), measured by a measurement method standardized by ISO2813, is less than 10, in terms of (i) the black electrically-conductive substance being likely to become difficult to be found due to matt or (ii) stain easily adhering to the surface of the separator winding core. In a case where the glossiness is greater than 130, it is likely to become difficult, due to stronger reflection of light, to find the stain such as the black electrically-conductive substance and the white substance. The glossiness of the surface of the separator winding core, therefore, is preferably not less than 10 but not more than 130, and more preferably not less than 20 but not more than 100.

The separator winding core in accordance with Aspect 5 of the present invention is preferably configured so that the surface includes a side surface of the separator winding core.

In a case where the separator winding core has such glossiness, it becomes easier to immediately find stain which adheres to the separator winding core. Note that such stain also adheres to the side surface of the surface of the separator winding core, but tends to usually adhere more to the side surface than to an outer peripheral surface of the surface of the separator winding core around which outer peripheral surface a separator is to be wound. Though the outer peripheral surface can have the above glossiness, the side surface more preferably has the above glossiness.

It is possible to adjust the glossiness of the separator winding core by, for example, roughening the surface of the separator winding core or by smoothening such as polishing the surface of the separator winding core. It is alternatively possible to adjust the glossiness by processing a metal mold itself for use in production of the separator winding core.

A separator roll in accordance with Aspect 6 of the present invention is configured to include: a separator winding core in accordance with any of Aspects 1 through 5; and a nonaqueous electrolyte secondary battery separator which is wound around the separator winding core.

With the configuration, it is possible to realize a separator roll which brings about an effect similar to that brought about by the separator winding core in accordance with an aspect of the present invention.

A method, in accordance with Aspect 7 of the present invention, of cleaning a separator winding core is configured to be a method of cleaning a separator winding core in accordance with any of Aspects 1 through 5, the method including the steps of: removing a foreign material which has adhered to a surface of the separator winding core; and checking whether or not a quantity of the foreign material is not more than a criterion.

A separator roll in accordance with Aspect 8 of the present invention is configured to be a separator roll in which the nonaqueous electrolyte secondary battery separator is wound around an outer peripheral surface of the separator winding core which has been cleaned by the method in accordance with Aspect 7.

With the configurations, it is possible to reduce a production cost of the separator roll by recycling the separator winding core which is relatively expensive. With the configurations, it is also possible to contribute to environmental conservation because of a reduction in waste amount of the separator winding core.

The present invention is not limited to the embodiments, but can be altered by a skilled person in the art within the scope of the claims. An embodiment derived from a proper combination of technical means each disclosed in a different embodiment is also encompassed in the technical scope of the present invention.

EXAMPLE

Experiments were conducted to study an effect brought about by the separator winding core in accordance with an embodiment of the present invention. Details of the experiments will be described below.

A first sample and a second sample were first prepared each of which was a substance disguised as stain which would adhere to the separator winding core.

The first sample was prepared as follows. Specifically, (i) 0.25 g of acetylene black (brand name: DENKA BLACK HS100, manufactured by Denka Company Limited), (ii) 1.15 g of PVDF (polyvinylidene fluoride resin) #1120 (manufactured by KUREHA CORPORATION, an NMP solution whose solid content concentration was 12% by weight), and (iii) 1.00 g of NMP (N-methyl-2-pyrolidone) were stirred and mixed so as to be homogenized. A first paint whose solid content concentration was 16% was thus prepared. A glass plate of 1 mm in thickness was coated with the first paint thus prepared, with the use of a coating bar at a clearance of 50 μm, and the glass plate was then dried at 80° C. The first sample was thus prepared. A weight per unit area of the disguised stain was 6.3 g/m². The weight per unit area was calculated based on a change in weight of the glass plate, i.e., based on (i) the weight of the glass plate which was not subjected to the coating and (ii) the weight of the glass plate which was subjected to the coating and the drying.

The second sample was prepared as follows. Specifically, (i) 0.25 g of acetylene black (brand name: DENKA BLACK HS100, manufactured by Denka Company Limited), (ii) 1.02 g of PVDF #1120 (manufactured by KUREHA CORPORATION, an NMP solution whose solid content concentration was 12% by weight), and (iii) 7.49 g of NMP were stirred and mixed so as to be homogenized. A second paint whose solid content concentration was 4% was thus prepared. A glass plate of 1 mm in thickness was coated with the second paint thus prepared, with the use of a coating bar at a clearance of 50 μm, and the glass plate was then dried at 80° C. The second sample was thus prepared. A weight per unit area of the disguised stain was 3.5 g/m². The weight per unit area was calculated based on a change in weight of the glass plate, i.e., based on (i) the weight of the glass plate which was not subjected to the coating and (ii) the weight of the glass plate which was subjected to the coating and the drying.

For each color of Examples 1 through 13 and Comparative Examples 1 through 7, (i) the first sample and the second sample were put on Standard Paint Colors 2015 H-Edition (pocket type, General Incorporated Association Japan Paint Manufacturers Association), (ii) a visual comparison was made, under an environment in which an illuminance was not less than 300 luxes, with the use of an Hf fluorescent lamp (FHF32EX-N-K, manufactured by Hitachi Appliances, Inc.), and then (iii) visibility was checked on the basis of the following criteria of judgment. In addition, a glossiness of each color of Standard Paint Colors 2015 H-Edition (pocket type, General Incorporated Association Japan Paint Manufacturers Association) was measured at an incident angle of 60° with the use of a Handy type Gloss Meter PG-IIM (manufactured by NIPPON DENSHOKU INDUSTRIES CO., LTD., applicable standard: ISO2813, measurement range: 0-1000 GU, resolution: 0.1 GU). Each glossiness thus measured was rounded off to the first decimal place.

Good visibility (disguised stain was clearly distinguished): Good

Adequate visibility (disguised stain was distinguished when it was carefully viewed): Adequate Poor Visibility (disguised stain was difficult to distinguish): Poor As a white foreign material, there was used a alumina (brand name: AKP-3000, manufactured by Sumitomo Chemical Company, Limited). For each color of Examples 1 through 13 and Comparative Examples 1 through 7, five milligrams of the white foreign material were put on Standard Paint Colors 2015 H-Edition (pocket type, General Incorporated Association Japan Paint Manufacturers Association), (ii) a visual comparison was made under the environment in which the illuminance was not less than 300 luxes, with the use of the Hf fluorescent lamp (FHF32EX-N-K, manufactured by Hitachi Appliances, Inc.), and then (iii) visibility was checked on the basis of the following criteria of judgment.

Good visibility (white foreign material was clearly distinguished): Good

Adequate visibility (white foreign material was distinguished when it was carefully viewed): Adequate Poor Visibility (white foreign material was difficult to distinguish): Poor Table 1 shows results obtained by checking the visibility. In Table 1, "First Sample (Heavy Weight per Unit Area)", "Second Sample (Light Weight per Unit Area)", and "White Foreign Material" show results obtained by checking the visibility of the first sample, the second sample, and the white foreign material, respectively.

TABLE 1

|  | Hue (Hue) | Lightness (Value) | Chroma (Chroma) | Glossiness | Visibility | | |
|---|---|---|---|---|---|---|---|
|  |  |  |  |  | First Sample (Heavy Weight per Unit Area) | Second Sample (Light Weight per Unit Area) | White Foreign Material |
| Ex. 1 | 5R | 3.0 | 1.0 | 46 | Adequate | Poor |  |
| Ex. 2 | 5G | 3.0 | 6.0 | 81 | Adequate | Poor |  |
| Ex. 3 | 5R | 3.0 | 2.0 | 46 | Adequate | Poor |  |

TABLE 1-continued

| | Hue (Hue) | Lightness (Value) | Chroma (Chroma) | Glossiness | Visibility First Sample (Heavy Weight per Unit Area) | Second Sample (Light Weight per Unit Area) | White Foreign Material |
|---|---|---|---|---|---|---|---|
| Ex. 4 | 5R | 4.0 | 12.0 | 77 | Good | Good | |
| Ex. 5 | 5G | 5.0 | 4.0 | 51 | Good | Good | |
| Ex. 6 | 10B | 5.0 | 10.0 | 80 | Good | Good | |
| Ex. 7 | 5YR | 6.5 | 0.5 | 73 | Good | Good | |
| Ex. 8 | 5G | 7.0 | 0.5 | 79 | Good | Good | |
| Ex. 9 | 5RP | 7.0 | 6.0 | 83 | Good | Good | |
| Ex. 10 | 5Y | 9.0 | 2.0 | 73 | Good | Good | Good |
| Ex. 11 | 5R | 9.2 | 1.0 | 77 | Good | Good | Adequate |
| Ex. 12 | 10YR | 9.2 | 1.0 | 79 | Good | Good | Adequate |
| Ex. 13 | 5GY | 9.2 | 1.0 | 77 | Good | Good | Adequate |
| Com. Ex. 1 | N | 1.0 | 0.0 | 68 | Poor | Poor | |
| Com. Ex. 2 | N | 1.5 | 0.0 | 79 | Poor | Poor | |
| Com. Ex. 3 | N | 2.0 | 0.0 | 79 | Poor | Poor | |
| Com. Ex. 4 | 5R | 2.0 | 1.0 | 59 | Poor | Poor | |
| Com. Ex. 5 | 5G | 2.0 | 2.0 | 79 | Poor | Poor | |
| Com. Ex. 6 | 7.5PB | 2.0 | 6.0 | 78 | Poor | Poor | |
| Com. Ex. 7 | N | 3.0 | 0.0 | 78 | Poor | Poor | |

Next, stain cores were prepared in each of which stain was adhered to a corresponding separator winding core.

First stain cores were prepared as follows. Cores were first prepared each of which was made of an ABS resin and had a corresponding glossiness shown in Table 2. Each of the cores had an external diameter of 6 inches (15.24 cm), a hue (Hue) of 10B, a lightness of 5.0, and a chroma of 10.0. Table 2 shows that the cores different in glossiness are indicated by respective of Example 6 (which is identical in color and is close in glossiness to Example 6 shown in Table 1), Examples 14 through 16, and Comparative Examples 8 and 9. Next, the first stain cores were prepared according to a method similar to that of preparing the first sample, except for applying the first paint onto each core made of the ABS resin. A weight per unit area of stain was 6.3 g/m². The weight per unit area was calculated based on a change in weight of each core, i.e., based on (i) the weight of each core which was not subjected to the application and (ii) the weight of each core which was subjected to the application and the drying. Each of the first stain cores was checked by visual observation, based on the foregoing criteria of judgment (see "First Stain Core (Heavy Weight per Unit Area)" in Table 2). Note that the glossiness of each of the cores was measured with the use of a glossiness meter Novo-Curve Glossmeter (manufactured by Rhopoint Instruments, applicable standard: ISO2813, measurement range: 0-1000 GU, resolution: 0.1 GU). Each measured value of the glossiness was rounded off to the first decimal place (incident angle: 60°).

Second stain cores were prepared as follows. Specifically, the second stain cores were prepared according to a method similar to that of preparing the second sample, except for applying the second paint onto each core made of the ABS resin. A weight per unit area of stain was 3.5 g/m². The weight per unit area was calculated based on a change in weight of each core, i.e., based on (i) the weight of each core which was not subjected to the application and (ii) the weight of each core which was subjected to the application and the drying. Each of the second stain cores was checked by visual observation, based on the foregoing criteria of judgment (see "Second Stain Core (Light Weight per Unit Area)" in Table 2). Note that the glossiness of each of the cores was measured with the use of the glossiness meter Novo-Curve Glossmeter (manufactured by Rhopoint Instruments, applicable standard: ISO2813, measurement range: 0-1000 GU, resolution: 0.1 GU). Each measured value of the glossiness was rounded off to the first decimal place (incident angle: 60°).

α alumina (brand name: AKP-3000, manufactured by Sumitomo Chemical Company, Limited) was employed as a white foreign material. Five milligrams of the white foreign material were put on each of the cores made of the ABS resin. A visual comparison was made, under an environment similar to the environment which has already described, and visibility was checked on the basis of the aforementioned criteria of judgment (see "White Foreign Material" in Table 2).

TABLE 2

| | Hue (Hue) | Lightness (Value) | Chroma (Chroma) | Glossiness | Visibility First Stain Core (Heavy Weight per Unit Area) | Second Stain Core (Light Weight per Unit Area) | White Foreign Material |
|---|---|---|---|---|---|---|---|
| Com. Ex. 8 | 10B | 5.0 | 10.0 | 134 | Adequate | Poor | Adequate |
| Ex. 14 | 10B | 5.0 | 10.0 | 121 | Good | Good | Adequate |
| Ex. 6 | 10B | 5.0 | 10.0 | 74 | Good | Good | Good |
| Ex. 15 | 10B | 5.0 | 10.0 | 29 | Good | Good | Good |
| Ex. 16 | 10B | 5.0 | 10.0 | 19 | Good | Adequate | Good |
| Com. Ex. 9 | 10B | 5.0 | 10.0 | 7 | Adequate | Poor | — |

The above experimental results demonstrate as follows: (i) the color of the separator winding core brings about a beneficial effect in a case where the color of the separator winding core is described by the Munsell color system as a lightness of not less than 3.0 but not more than 9.2, and a chroma of not less than 0.5; (ii) a more beneficial effect is brought about in a case where the lightness is not less than 4.0 but not more than 9.0; (iii) the separator winding core brings about a more beneficial effect in a case where the separator winding core has a glossiness of not less than 10 but not more than 130 as well as meets the above lightness and chroma; and (iv) the glossiness is more preferably not less than 20 but not more than 100.

REFERENCE SIGNS LIST

100: Separator roll (film roll)
101: Separator winding core (film winding core)
102: Nonaqueous electrolyte secondary battery separator (film)

The invention claimed is:

1. A separator winding core comprising a nonaqueous electrolyte secondary battery separator which is wound around the separator winding core,
   the separator winding core being described by the Munsell color system as (i) a lightness (value) of not less than 3.0 but not more than 9.2 and (ii) a chroma of not less than 0.5.

2. The separator winding core as set forth in claim 1, wherein the lightness is not less than 4.0 but not more than 9.0.

3. The separator winding core as set forth in claim 1, wherein the separator winding core has a surface whose glossiness is not less than 10 but not more than 130.

4. The separator winding core as set forth in claim 3, wherein the glossiness of the surface is not less than 20 but not more than 100.

5. The separator winding core as set forth in claim 3, wherein the surface includes a side surface of the separator winding core.

6. A method of cleaning a separator winding core, the winding core comprising a nonaqueous electrolyte secondary battery separator which is wound around the separator winding core; the separator winding core being described by the Munsell color system as (i) a lightness (value) of not less than 3.0 but not more than 9.2 and (ii) a chroma of not less than 0.5; wherein the method comprises the steps of: prior to winding the separator,
   removing a foreign material which has adhered to a surface of the separator winding core; and
   checking whether or not a quantity of the foreign material is not more than a criterion.

* * * * *